United States Patent [19]

Tanaka et al.

[11] Patent Number: 5,377,067
[45] Date of Patent: Dec. 27, 1994

[54] JUNCTION BOX WITH PROTECTION FUNCTION TO PROTECT FROM OVERVOLTAGE AND OVERCURRENT

[75] Inventors: Yoshiyuki Tanaka; Koichi Kurasawa, both of Yokoze; Keisuke Kumano, Tokyo, all of Japan

[73] Assignee: Mitsubishi Materials Corp., Japan

[21] Appl. No.: 84,468

[22] Filed: Oct. 4, 1993

Related U.S. Application Data

[63] Continuation of Ser. No. 760,901, Sep. 17, 1991, abandoned.

[30] Foreign Application Priority Data

Sep. 18, 1990 [JP] Japan .................................. 2-246309

[51] Int. Cl.$^5$ ............................................. H02H 3/20
[52] U.S. Cl. ..................................... 361/104; 361/119; 361/55; 361/56

[58] Field of Search ............... 361/119, 104, 111, 127, 361/55, 56

[56] References Cited

U.S. PATENT DOCUMENTS

| | | | |
|---|---|---|---|
| 4,389,695 | 6/1983 | Carpenter, Jr. .................. | 361/104 |
| 4,477,857 | 10/1984 | Crocker ............................ | 361/119 |
| 4,922,374 | 5/1990 | Mueller et al. .................... | 361/119 |
| 5,067,915 | 11/1991 | Kienast ............................. | 361/119 |

*Primary Examiner*—Todd E. DeBoer
*Attorney, Agent, or Firm*—Hoffman, Wasson & Gitler

[57] ABSTRACT

A junction box for the protection of electronic devices and communication lines from lightning surges, overcurrent and overvoltage. The box includes sockets for connection to the devices and liens along with a plurality of combinations of surge absorbing elements and low melting point metal wires for the protection feature.

6 Claims, 2 Drawing Sheets

JUNCTION BOX WITH PROTECTION FUNCTION TO PROTECT FROM OVERVOLTAGE AND OVERCURRENT

This is a continuation of copending application Ser. No. 07/760,901 filed on Sep. 17, 1991 now abandoned.

FIELD OF THE INVENTION

The present invention relates to a junction box with a protection function to protect from an overvoltage or overcurrent. Particularly, it relates to a junction structure using a surge absorber, which can protect an electronic device and a communication line from a lightning surge as well as from continuous overvoltage or overcurrent which may be generated by a short-circuit with an alternating current electric source and the like.

DESCRIPTION OF THE PRIOR ART

A surge absorber is used to protect equipment as a communication line, e.g. a telephone line for telephones and telecopiers, a line for a cable television and/or cable radio, and the like, as well as a device, e.g. semiconductor device, from a lightning surge.

The protection function of a surge absorber is to protect a communication device's connecting communication line, when the communication line interconnects the source line to load overcurrent or overvoltage on the line, which will heat the breaker fuse wire so as to melt the wire, thereby opening the circuit to protect the equipment from the overcurrent and overvoltage. In a conventional surge absorber functioning to protect from overcurrent and overvoltage, a low melting point metal wire surrounds the surge absorber within an inorganic material housing. Connecting terminals are provided at the both of the ends of the inorganic material housing of the surge absorber.

When a surge occurs, for example, lightning is generated, protection of the device is attained by flowing the excessive current through the surge absorbing element to ground.

For an overvoltage or overcurrent, a breaker fuse is provided which is broken by an electric current generated in the fuse itself, so that the circuit is opened, thereby protecting the circuit.

Heretofore, protective networks for protecting equipment from overvoltage have employed a spark gap surge absorbing element to shunt overvoltage and excessive currents from the input conductor to ground, and further employed a series connected fuse for disconnecting or open circuiting to the source of overvoltage or current from the equipment to be protected. Such a protective network is described in U.S. Pat. Nos. 3,448,341 and 3,795,846.

In the prior art junction box for a communication line such as a telephone line, a circuit breaker fuse is used for protecting communication equipment connecting to a line, from overcurrent and overvoltage. Further, an element for protecting from overcurrent and overvoltage, such as a surge absorber is used in direct soldering to the circuit board of communication equipment.

In the above-mentioned methods, a fuse and a low melting point metal wire are removed after the breaker functions, or after the short-circuit is dissolved, and thereafter, a breaker fuse must be replaced, or further a surge absorbing element should be replaced.

Many attempts have been made to resolve these problems in the junction box for protection of a communication line and telephone switchboard, and the like, from a lightning surge and overvoltage or overcurrent.

SUMMARY OF THE INVENTION

With the foregoing considerations in mind, the present invention contemplates the provision of an improved junction box.

It is an object of the present invention to provide a junction box to protect a device or a telephone line from a surge such as lightning surge as well as from overvoltage or overcurrent.

It is another object of the present invention to provide a structure of a junction box wherein a plurality of surge absorbers are provided therewithin to protect the communication lines.

It is a further object of the present invention to provide a junction box, which is easily detached and attached to the communication lines.

DETAILED DESCRIPTION OF PREFERRED EMBODIMENTS

Figure 1:
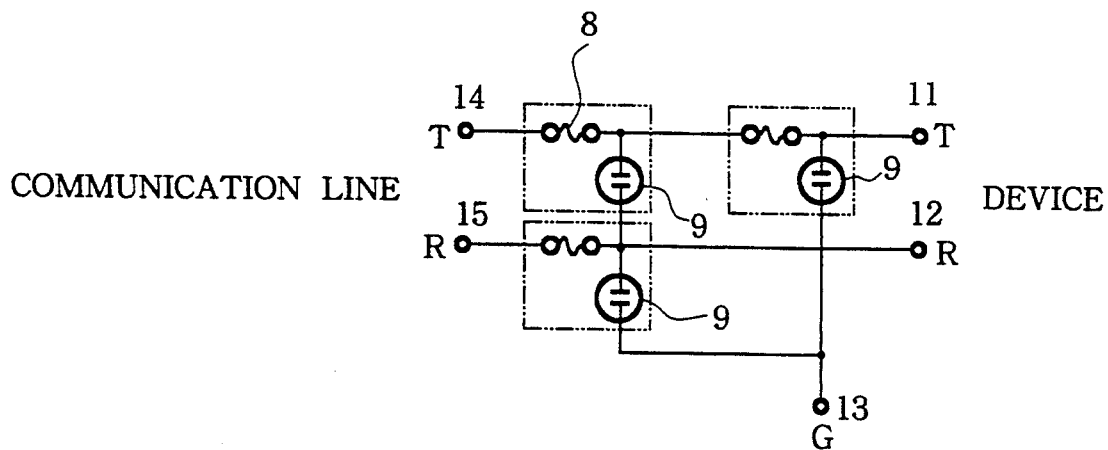
FIG. 1 is a schematic diagram of a circuit of the junction box of the present invention.

In accordance with the present invention, a junction box to protect a device and a communication line, comprising a pair of sockets for connection to a communication line; a pair of sockets for connection to the device; a plurality of surge absorbing elements, each of which is arranged in parallel with said device and said lines, for absorbing a surge from said device or said lines; and a plurality of low-melting point metal wires, each of which is arranged in series to the device and the lines, and positioned contacting the surface of the respective surge absorbing element.

In accordance with the present invention, each of the microgap surge absorbers and each of the low melting point metal wires are provided within a hollow space, wherein the wires have an inner diameter larger than the outer diameter of the absorber, and they are mounted on a resin base at both ends thereof, within a hollow space of an inorganic material housing. Preferably, connecting pins (lead pins) have been previously mounted on the resin base of the surge absorbing element, and both terminals of the microgap surge absorber and both terminals of the low melting point metal wire are respectively connected to each of the top ends of the lead pins mounted on the base.

Each of surge absorbing elements is arranged in parallel with the equipment to be protected, and each of low temperature melting wires is connected in series to both of the equipment to be protected and the surge absorbing element so as to form a circuit of a junction box.

When the overvoltage or overcurrent is applied to the junction e.g. by interconnecting of the communication line with an electric source, the surge absorbing element accepts the overcurrent (i.e. the overcurrent flows through the surge absorbing element to the ground) and then such excessive current flowing to the ground will fuse the low melting point metal wire to open the circuit (to cut off the junction).

In one embodiment of the inventive junction box, a predetermined number of connecting pins having a diameter of 0.5 to 1.0 mm are mounted on a base made of epoxy resin or poly butadiene-type resin. These connecting pins are used to affix the surge absorbing elements and the low melting point metal wires. The low melting point metal wires are engaged within a narrow hollow space in the junction box. Therefore, the heat generated by the gap or microgap surge absorbing elements fixed within the junction box can easily conduct to the low melting point metal wire, thereby fusing the wire to open the circuit of the junction box.

The low-melting point metal wire, used in the inventive junction box, easily and readily melts and will open the junction circuit when a current excessive over a certain value flows through the surge absorbing element, and the low melting point metal wire. A plurality of combinations of a gap or microgap surge absorbing element and a low melting point metal wire are fixed within the junction box, wherein both terminals of each of the surge absorbing elements and both terminals of each of the low melting point metal wires are connected respectively to each of the tops of the connecting pins which have been mounted or affixed on the base. Such connection can be carried out by soldering or spot welding, and such connection is not restricted to a specific method. Further, a plurality of combinations, of the surge absorbing element and the low melting point metal wire, are cased within a housing or casing of a resin which is the same resin as that of the base. Further, the inventive junction box has a predetermined number of joint sleeves (legs) which can be a metal spring coupler. The joint sleeves can couple with connection plates of the communication lines and the device. The number of joint sleeves corresponds to the number of terminals of the elements to be connected, including the communication lines, and the device.

The low melting point metal wire preferably has a melting point of 65° C. to 165° C. When the temperature of the wire is up to 65° C., the junction box can be opened, i.e., at the temperature of the equipment to be protected. When the melting point exceeds 165° C., heat can affect the feature of the junction box.

The efficiency of assembling the inventive junction box can be improved by using a predetermined number of the lead pins which are initially mounted or affixed to the resin base so as to assemble or affix a plurality of surge absorbing elements and a plurality of low melting point metal wires within the junction box. And further, replacing the elements and the wires can be easily carried out.

The junction box of the present invention can be used to connect a telephone, a telephone line exchanging board, a telecopier machine and a modem of a personal computer to a communication line.

The present invention is further illustrated by the following example to show the structure of the inventive junction box, but should not be interpreted for limitation of the invention.

EXAMPLE

FIG. 1 is a schematic diagram of a circuit of the junction box. In this embodiment, each of three microgap surge absorbing elements 9 is provided respectively between the communication lines, between the communication line and the ground earth, and between the equipment and the ground earth. Further, each one of the low melting point metal wires 8 is provided in series, respectively, to the communication lines, and the equipment, and respectively in series to each of the surge absorbing elements as shown in FIG. 1. Terminals 11 and 12 for connection to the electric equipment are provided, and terminal 13 is provided for the ground earth, and further, terminals 14 and 15 are provided for the communication lines.

Figure 2:
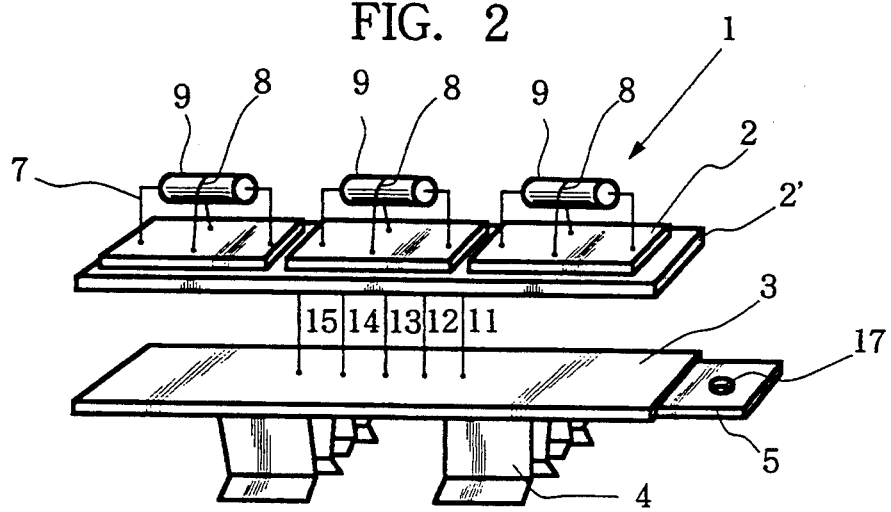
FIG. 2 is a schematic view of a junction box of the present invention, which comprises a plurality of microgap surge absorbing elements 9 arranged in parallel with a telephone, and a plurality of low melting wires 8 positioned in contact with the surface of each of the surge absorbing elements, and connecting sockets to connect respectively to each of the communication lines and the device.

FIG. 2 shows a structure of the inventive junction box. As shown in FIG. 2, connecting pins 7 having a diameter of 0.8 mm, and a length of 10.0 mm are mounted on a base 2 made of polybutadiene type resin, and each of the microgap surge absorbing elements 9 having an outer diameter of 3.3 mm, and an outer length of 7.0 mm is mounted on a lead pin 7, and further, each of the zinc wires (low melting point metal wires) 8 is mounted contacting the respective surface of the corresponding surge absorbing elements 9. Further, the assembled base 2 with three sets of a surge absorbing element 9 and a zinc wire 8 is affixed on the base 2'.

On the back surface of the base 2' of FIG. 2, electric electrode patterns in accordance with the circuit of FIG. 1 are formed to each of terminals corresponding to the terminals 11 and 12 to the communication lines, the terminals 14 and 15 of the electric equipment and the ground terminal 13 of FIG. 1, and further, the leads 11, 12, 13, 14 and 15 of FIG. 2 corresponding to each terminal 11, 12, 13, 14 and 15 of FIG. 1 are formed from the back surface of base 2', and connect to sockets of a junction box board through the board. The base 2' is adhered to the board 3, and each socket 4 is mounted on the board 3. The sockets 4 electrically connect each of the communication lines and the terminals of the equipment. The lead 13 connects the ground terminal 5 provided at the end of the board 3. The connecting hole 17 is provided at the center of the ground terminal 5.

Figure 3:
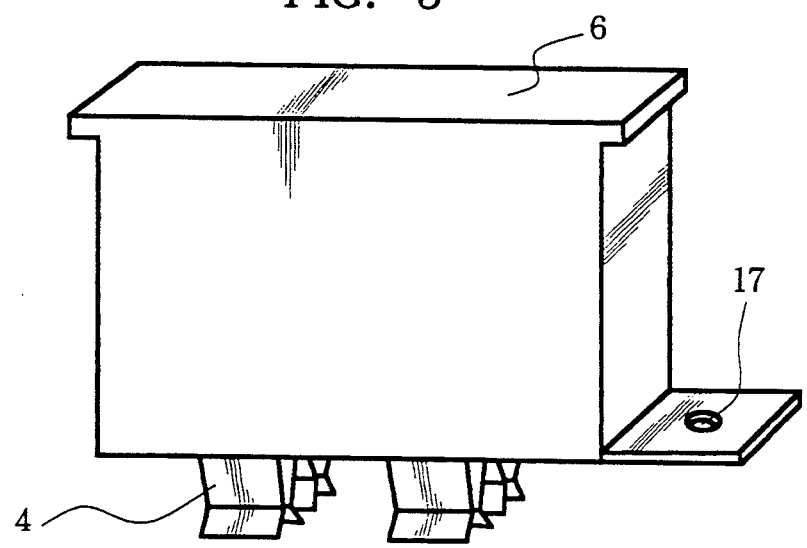
FIG. 3 shows an appearance of the junction box of FIG. 2.

FIG. 3 shows the appearance of the inventive junction box, having a cover 6 (housing), and sockets 4 at the bottom thereof and the ground terminal connecting hole 17.

Figure 4A:
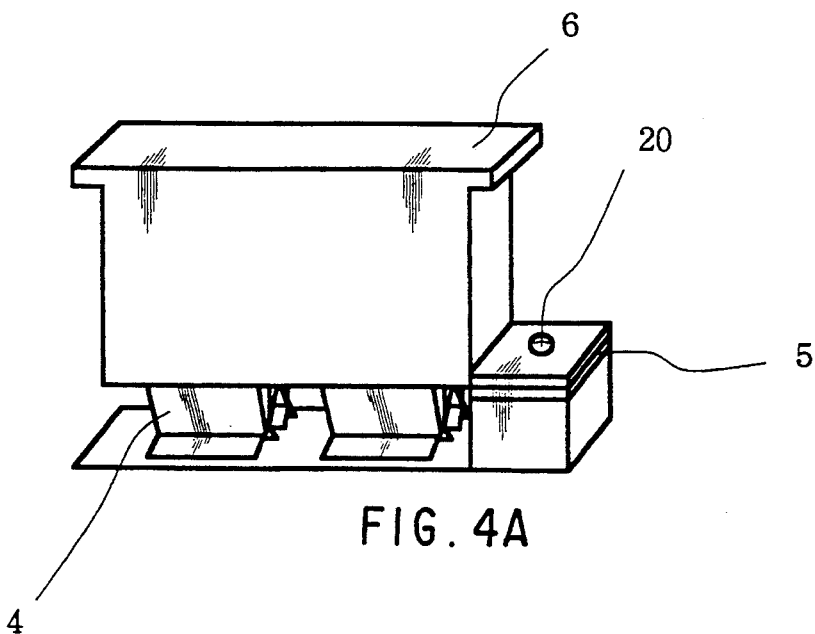
FIGS. 4A and 4B show the structure and the assembly of the junction box of the present invention.
Figure 4B:
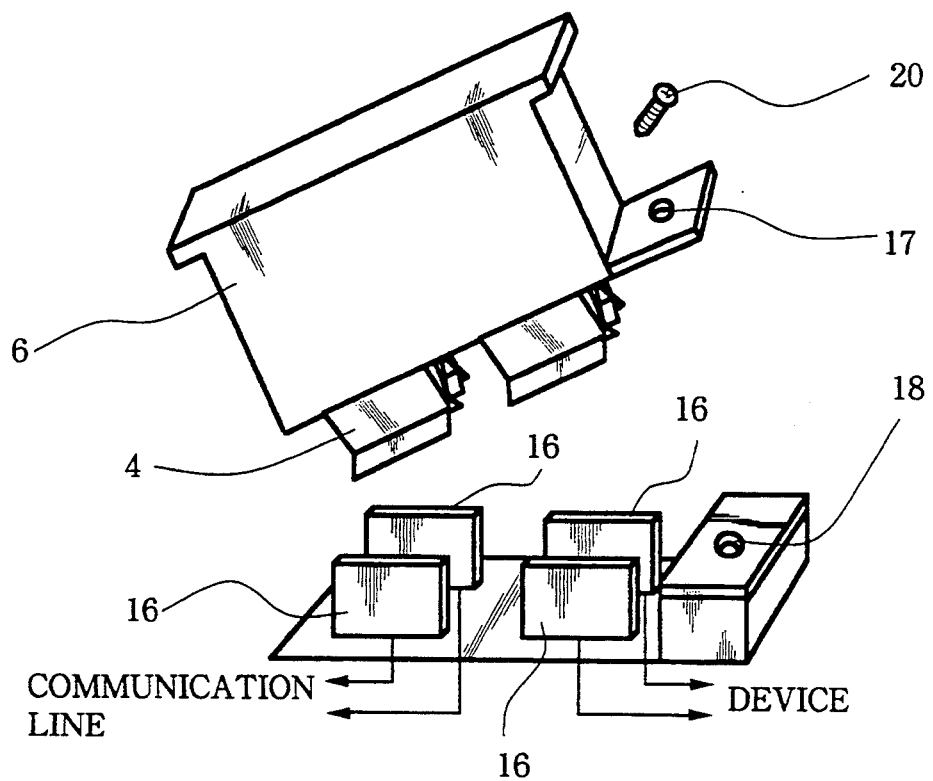

FIG. 4A and FIG. 4B show the inventive junction box connecting to the terminal plugs (coupler). Each socket 4 is respectively engaged to the plug plate (coupler) 16. The ground terminal 5 is fixed by a fixing pin 20 through a connecting hole 17 to a screw hole 18. Each sockets 4 (coupler) and a fixing pin 20 can be detached or disconnected as shown in FIG. 4B, from a coupling substrate.

Further, a casing 6 (housing) made of poly butadiene type resin is provided on a base 2' and a board 3, as shown in FIG. 3, and FIGS. 4A and 4B. The casing is to protect the structure of the junction box.

Combinations of a surge absorbing element and a low melting point metal wire are respectively assembled by respective lead pins mounted on the same surface of a resin base, within a hollow space in the junction box, and therefore, efficiency of assembly is improved. Further, replacements for the combinations can be easily carried out.

The advantage of the junction box of the present invention is that it provides a structure of a junction box having a function to protect a communication line as well as a device from overvoltage and overcurrent, by providing a plurality of combinations of a surge absorbing element and a low melting point metal wire in the space of the junction box. Further, the junction box can provide easy connection of the electronic device with a communication line(s) by inserting the sockets of the junction box to the plugs of the communication lines. Further, the degraded surge absorbing element and broken wire can be easily replaced in combination.

We claim;

1. A circuit connecting a pair of communication lines respectively to a pair of input leads of an electronic device, comprising:
   (a) a pair of sockets for connecting respectively to said pair of communication lines;
   (b) a pair of sockets for connecting respectively to said pair of the input leads of the electronic device;
   (c) one or more low melting point wires;
   (d) one or more surge absorbing elements, the number of which correspond to the number of said one or more low melting point wires;
   (e) a grounding lead wherein each of said surge absorbing elements is arranged in parallel with said communication line and said electronic device, and is positioned respectively between said pair of the communication lines, and between one of said input leads for the electronic device and the grounding lead, and between another one of said input leads for the electronic device and the grounding leads, and each of said low melting point metal wires is arranged respectively in series with each of said communication lines, said electronic device and each of said surge absorbing elements; and further each of said low melting metal wires is positioned in direct thermal contact respectively with a surface of each of said surge absorbing elements.

2. A circuit in accordance with claim 1, wherein said combination of surge absorbing elements and low melting point metal wires are mounted respectively through each of connecting pins onto a resinous molded base.

3. A circuit in accordance with claim 1, wherein each of said low melting point metal wire has a melting point from 65° C. to 165° C.

4. An in-line electrical load protection circuit comprising:
   (a) a pair of input sockets;
   (b) a pair of output sockets for connecting respectively to said pair of the input leads for the electronic device;
   (c) one or more low melting point wires; and
   (d) one or more surge absorbing elements, the number of which correspond to the number of said one or more low melting point wires;
   (e) a grounding lead wherein each of said surge absorbing elements is arranged in parallel with said communication line and said electronic device, and is positioned respectively between said pair of the communication lines, and between one of said input leads for the electronic device and the grounding lead, and between another one of said input leads for the electronic device and the grounding leads and each of said low melting point metal wires is arranged respectively in series with each of said communication lines, said electronic device and each of said surge absorbing elements; and further each of said low melting metal wires is positioned in direct thermal contact respectively with a surface of each of said surge absorbing elements.

5. The in-line electrical load protection circuit in accordance with claim 4 wherein each of said combination of said surge absorbing elements and said low melting point metal wires are mounted respectively through each of connecting pins onto said resin molded base.

6. The in-line electrical load protection circuit in accordance with claim 4 wherein each of said low melting point metal wire has a melting point from 65° C. to 165° C.

* * * * *